US005774567A

United States Patent [19]

Heyl

[11] Patent Number: 5,774,567

[45] Date of Patent: Jun. 30, 1998

[54] AUDIO CODEC WITH DIGITAL LEVEL ADJUSTMENT AND FLEXIBLE CHANNEL ASSIGNMENT

[75] Inventor: Lawrence F. Heyl, Mountain View, Calif.

[73] Assignee: Apple Computer, Inc., Cupertino, Calif.

[21] Appl. No.: 420,359

[22] Filed: Apr. 11, 1995

[51] Int. Cl.[6] .......... H04B 1/00

[52] U.S. Cl. .......... 381/119; 381/118; 370/266; 370/267; 379/202; 341/141; 341/143

[58] Field of Search .......... 381/118, 119; 341/141, 143; 379/202; 370/266, 267

[56] References Cited

U.S. PATENT DOCUMENTS

| | | | |
|---|---|---|---|
| 5,119,422 | 6/1992 | Price | 381/24 |
| 5,196,852 | 3/1993 | Galton | 341/143 |
| 5,208,594 | 5/1993 | Yamazaki | 341/143 |
| 5,483,528 | 1/1996 | Christensen | 381/119 |
| 5,528,239 | 6/1996 | Swanson et al. | 341/143 |
| 5,533,112 | 7/1996 | Danneels | 379/202 |
| 5,647,008 | 7/1997 | Farhangi et al. | 381/119 |

*Primary Examiner*—Curtis Kuntz
*Assistant Examiner*—Duc Nguyen
*Attorney, Agent, or Firm*—Beyer & Weaver, LLP

[57] ABSTRACT

An audio codec capable of handling complex control and routing of numerous sound inputs is described. The complex control and routing is obtained by weighting various sound inputs in accordance with weighting values and then digitally mixing the weighted sound inputs together. The invention facilitates construction of the audio codec with mainly fixed gain amplifiers, instead of variable gain preamplifiers, thereby saving a large amount of die space and reducing time needed for testing.

13 Claims, 5 Drawing Sheets

AUDIO CODEC WITH DIGITAL LEVEL ADJUSTMENT AND FLEXIBLE CHANNEL ASSIGNMENT

BACKGROUND OF THE INVENTION

The present invention relates to codecs, and more particularly, to audio codecs suitable for supporting sophisticated multimedia functions within personal computers.

In the past, personal computers had only a single speaker output which provided audio sounds to the user. The quality of the sound output provided by the speaker was quite poor. Add-on sound boards have been used to enhance the sound quality of personal computers by supporting multiple speakers and stereo sound. The add-on boards are typically used to enhance the sound quality for game programs.

More recently, audio codecs have been used in personal computers to provide stereo input and output capabilities with sound quality on the order of that provided by compact discs. Existing audio codecs are constructed using a variable gain preamplifier followed by an analog-to-digital converter for each analog input. FIG. 1 illustrates an input block 2 and an analog-to-digital (A/D) block 4 of a conventional audio codec. The input block 2 includes an input multiplexer 6 and variable gain circuits 7. The AID block 4 includes A/D converters 8. The digital outputs provided by the audio codec are fed to a serial interface controller (not shown) which can output the digital signals or forward them to a processing unit of the personal computer. Monitoring is often done by returning the digital output for digital-to-analog conversion or by routing the preamplified analog input to a suitable analog output line or channel (e.g., speaker or headphones). Such monitoring ensures that the correct signal is being applied, and that the signal is of an acceptable level and is free of artifacts.

One problem with existing audio codecs is that their capabilities cannot be extended to handle complex control and routing of numerous analog inputs without unduly raising their cost. The reason that the conventional approach cannot practically extend to handle additional inputs is that extending the number of input ports beyond a few (e.g., three) becomes very expensive to implement primarily because the variable gain preamplifiers require a significant amount of die space. The cost of a codec increases proportionally with the die space required to implement the codec. It is anticipated that in the near future there will be a need to handle about six input sources, including microphones, CD-ROM audio, television, radio, and communications audio. Using the conventional approach, six independent analog variable gain preamplifiers would be needed (one for each input source). Such an implementation would consume a large area of die space and render the codec too costly.

Thus, there is a need for an audio codec which is capable of supporting numerous audio inputs in a cost effective manner.

SUMMARY OF THE INVENTION

Broadly speaking, the present invention relates to a method and apparatus for digitally mixing together various sound inputs in accordance with weighting values.

As an apparatus for coding and decoding sound signals, the invention includes a delta sigma modulator for each of the sound inputs, a level adjustment circuit for each of the delta sigma modulators, and a combiner for each output signal line. The delta sigma modulators receive their respective input analog sound signal and output a digital sound signal. Digital sound signals can also be received. The associated level adjustment circuit receives the digital sound signal as well as a predetermined weight value for each of the output signal lines. The associated level adjustment circuit then operates to output a weighted digital sound signal for each of the output signal lines. The combiner for each of the output signal lines combines (preferably adds) together the weighted digital sound signals output by each of the level adjustment circuits that are destined for a particular output signal line.

As a method for coding sound signals, the invention includes receiving sound signals, digitizing the sound signals to produce digital sound signals, independently adjusting the level of each of the digital sound signals for each of a plurality of output lines, and mixing the adjusted digital sound signals that correspond to each of the plurality of output lines.

One advantage of the invention is that variable gain preamplifiers are no longer required for high quality sound systems within personal computers. By using the invention, fixed gain preamplifiers can be utilized instead of variable gain preamplifiers, thereby saving a large amount of die space. Another advantage of the invention is the ability to support complex routing of numerous input sources. Yet another advantage of the invention is that the time needed to test the apparatus is substantially reduced because fixed gain preamplifiers require much less time to test than do variable gain amplifiers.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to an audio codec that is able to handle complex control and routing of numerous sound inputs in a cost effective manner. The complex control and routing is obtained by weighting various sound inputs in accordance with weighting values and then digitally mixing the weighted sound inputs together.

Embodiments of the invention are discussed below with reference to FIGS. 2–5. However, those skilled in the art will readily appreciate that the detailed description given herein with respect to these figures is for explanatory purposes as the invention extends beyond these limited embodiments.

Figure 1:
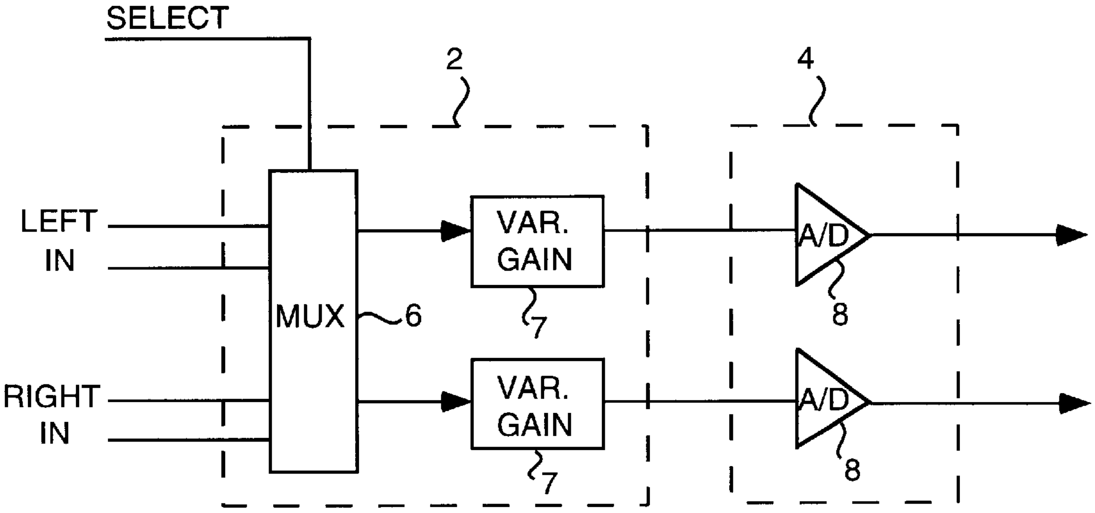
FIG. 1 PRIOR ART
FIG. 1 is a block diagram of a conventional audio codec.
Figure 2:
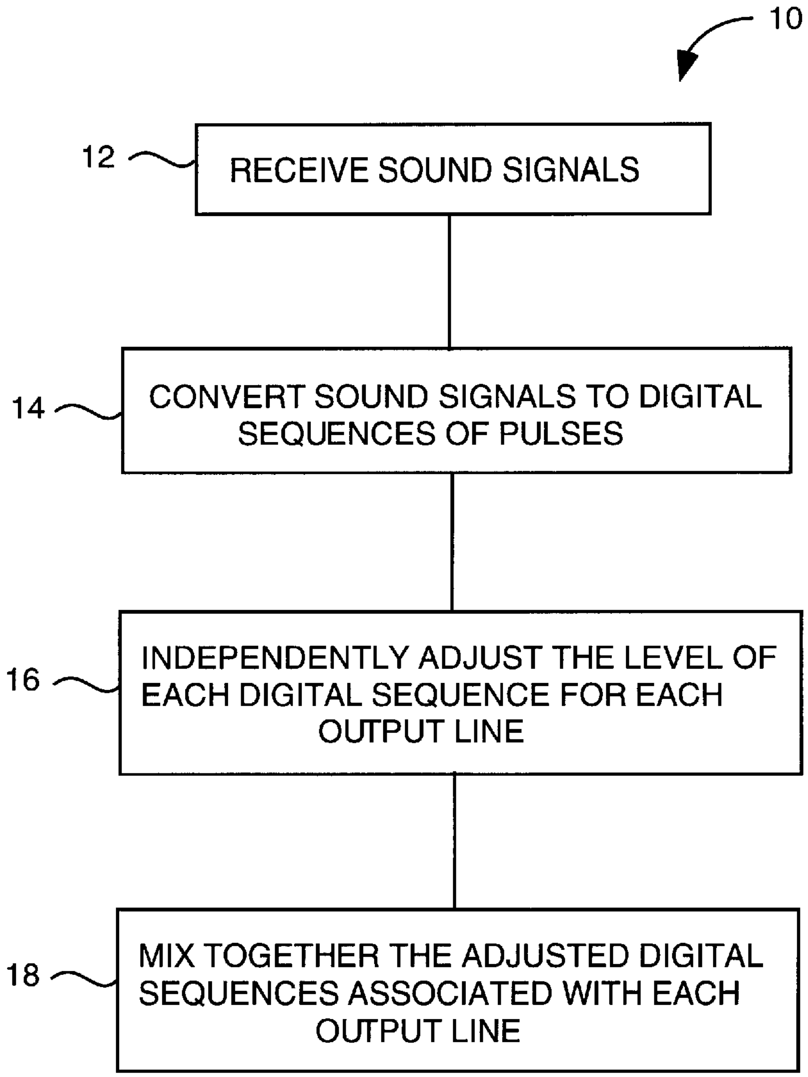
FIG. 2 is a flowchart of a basic method according to the invention.

FIG. 2 is a basic flowchart of an embodiment of a method 10 according to the invention. The method 10 implements the functionality of an audio codec and begins by receiving in a step 12 various sound signals to be processed. The sound signals or inputs may be analog sound inputs or digital sound inputs. Examples of sources providing the analog sound inputs are internal or external microphones, televisions, FM receivers, and the like. Examples of sources providing digital sound inputs are CD-ROM drives, digital audio tape (DAT) drives, and the like. A digital sound input could also be input by a host computer itself. Next, the received sound signals are converted in a step 14 into digital sequences of pulses. In particular, an input analog sound signal would be converted into a digital sequence of serial pulses representing the analog sound signal in a digital format. For the sound signals which are received in a digital format, the sampling rates of the input signals are matched to the internal rate of the audio codec, and then the digital sound signals are converted to a digital sequence of pulses using techniques well known in the art. The modified digital sound signals are then compatible with the digital sequences of other sound inputs.

After the sound signals are placed in a common digital format, the level of the digital sequences being supplied to each output line of the audio codec can be independently adjusted in a step 16. Thereafter, the adjusted digital sequences associated with each of the output lines can be mixed together in a step 18, thereby producing the output signals. For example, a digital sequence of pulses corresponding to a first analog input source might be adjusted in a step 16 to a first level for a first output line and to a second level for a second output line, and a digital sequence of pulses corresponding to a second analog input source might be adjusted in a step 16 to a third level for the first output line and to a fourth level for the second output line. In this simplified example, by mixing in a step 18 the adjusted digital sequences, the output signal placed on the first output line could be the digital sum of the first and third levels, and the output signal placed on the second output line could be the digital sum of the second and fourth levels.

Figure 3:
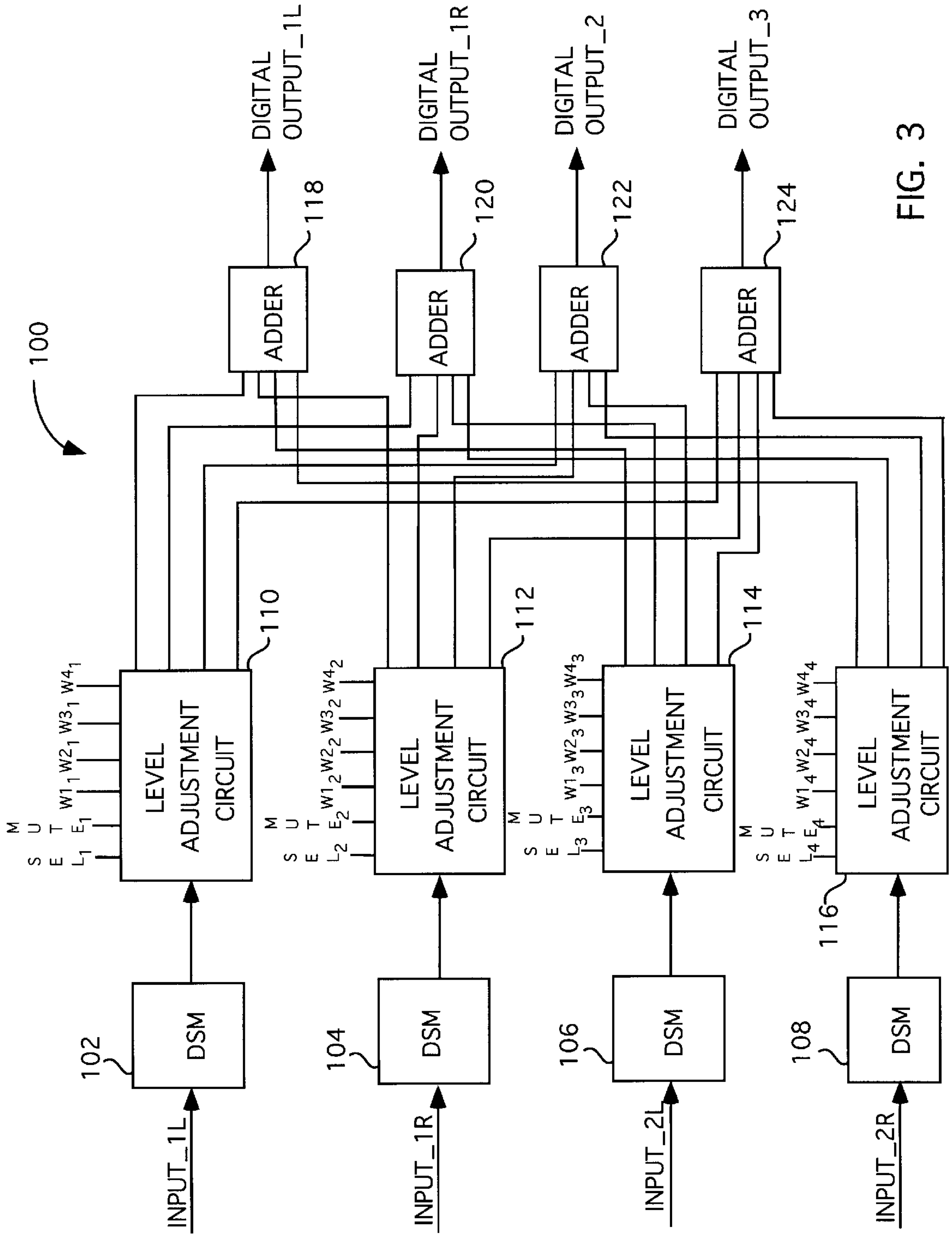
FIG. 3 is a block diagram of an apparatus according to a first embodiment of the invention.

FIG. 3 is a block diagram of a first embodiment of an apparatus 100 according to the invention. Typically, but not necessarily, the apparatus 100 is an audio codec found within a computer system. The apparatus 100 has first and second input channels and first and second output channels. Each of the channels normally includes two signal lines, but sometimes only one. The first input channel includes INPUT_1L and INPUT_1R input lines, and the second input channel includes INPUT_2L and INPUT_2R input lines. The first output channel includes OUTPUT_1L and OUTPUT_1R output lines, and the second output channel includes OUTPUT_2L and OUTPUT_2R output lines. The left and right versions of each pair of output lines forming a channel are separate and independent because each such pair forms a stereo channel. In this embodiment all input lines are analog and all output lines are digital, but as illustrated by other embodiments, the apparatus can also receive digital inputs and produce analog outputs. In any case, the number and types of inputs and outputs will depend on interface requirements of the particular implementation. Usually, however, most of the inputs to the apparatus are analog.

The apparatus 100 includes delta sigma modulators (DSM) 102, 104, 106 and 108. Each of the delta sigma modulators 102–108 receives an input signal and outputs a serial digital signal which has a width of only one bit. The serial digital signal in this embodiment assumes values of +1 or −1. Delta sigma modulators are a type of analog-to-digital converter in which the density of pulses represents the relative amplitude of the input signal. Because delta sigma modulators are so well known in the art, they are not further discussed herein. See, for example, *Oversampling Delta-Sigma Data Converters: Theory, Design, and Stimulation*, "Oversampling Methods for A/D and D/A Conversion", by James C. Candy and Gabor C. Temes, New York, IEEE Press, 1992, pp. 1–25.

There are other devices for performing the functions of the delta sigma modulators (DSM) of the present invention. The essential requirement of such devices is that the coded output have only one bit. Examples of such other devices include delta modulators (which will generally have lower quality resultant) and higher order predictive coders (which can have a better quality resultant). However, based on a variety of factors including the cost-benefit factor, DSM's are the preferred of such apparatus for use in the present invention.

The apparatus 100 further includes level adjustment circuits 110, 112, 114 and 116. As shown in FIG. 3, there is a one-to-one relationship between a particular input signal, a delta sigma modulator and a level adjustment circuit. Each of the level adjustment circuits 110, 112, 114 and 116 receives a digital sequence of pulses from its associated delta sigma modulator 102, 104, 106 or 108 and outputs a weighted digital sequence for each output line. Each of the level adjustment circuits 110–116 also receives a select signal (SEL), a mute control signal (MUTE), and weight values W1, W2, W3 and W4. The individualized select and the mute control signals are control signals for the level adjustment circuits 110–116. The weight values W1, W2, W3 and W4 are respectively associated with the output lines. In the embodiment shown in FIG. 3 there are four output lines; hence, there are four weight values W1, W2, W3 and W4. In this embodiment, the weight value W1 is associated with the first output line OUTPUT_1L, the weight value W2 is associated with the second output line OUTPUT_1R the weight value W3 is associated with the third output line OUTPUT_2L, and the weight value W4 is associated with the fourth output line OUTPUT_2R.

The weight values W1, W2 W3 and W4 indicate the extent to which the associated digital sequence of pulses is supplied to an output line. The weight values are preferably determined by application programs executed by the computer system. For example, the weight values may be set in registers or other storage areas using application programs, operating systems or external hardware along with techniques well known in the art. The operation of the level adjustment circuits 110–116 are further described with reference to FIG. 4.

In any case, the weighted digital sequences output by the level adjustment circuits 110–116 are respectively supplied to adders 118, 120, 122 and 124. Namely, the adder 118 receives the first weighted digital sequences output from each of the level adjustment circuits 110–116. The adder 120 receives the second weighted digital sequences output from each of the level adjustment circuits 110–116. The third adder 122 receives the third weighted digital sequences output from each of the level adjustment circuits 110–116. The fourth adder 122 receives the fourth weighted digital sequences output from the level adjustment circuits 110–116. The adders 118–124 operate to add the weighted digital sequences they receive as inputs and then output a mixed digital signal on the associated output line.

The output lines designated in FIG. 3 as digital OUTPUT_1L and digital OUTPUT _1R are associated with the first output channel and the output lines designated as digital OUTPUT_2L and digital OUTPUT_2R are associated with the second output channel. Typically, the first output channel would be connected to digital-to-analog converters to convert the signal back to an analog output for use by speakers or headphones. The second output channel typically remains in digital form and is forwarded back to the computer system for further processing. A two output channel system such as described in this embodiment defines a basic two bus stereo mixer. However, it should be noted that more than two buses or output channels may be provided and that the output channels or buses need not operate in stereo.

The ability of the invention to support complex control and routing is clearly shown by this embodiment. Namely, the analog input sound sources may be converted to digital sequences using delta sigma modulators and then the corresponding digital sequences can be selectively routed to any of the four destination output lines. By this approach, the level to which each of the digital sequences contributes to the output signals on such output lines can be independently adjusted using digital weight values. In effect, these weighting values set levels of a given sound source in the mixed output signals. In the present invention, the digital weight or digital weighting values are preferably at least three bits, and more preferably four bits.

Figure 4:
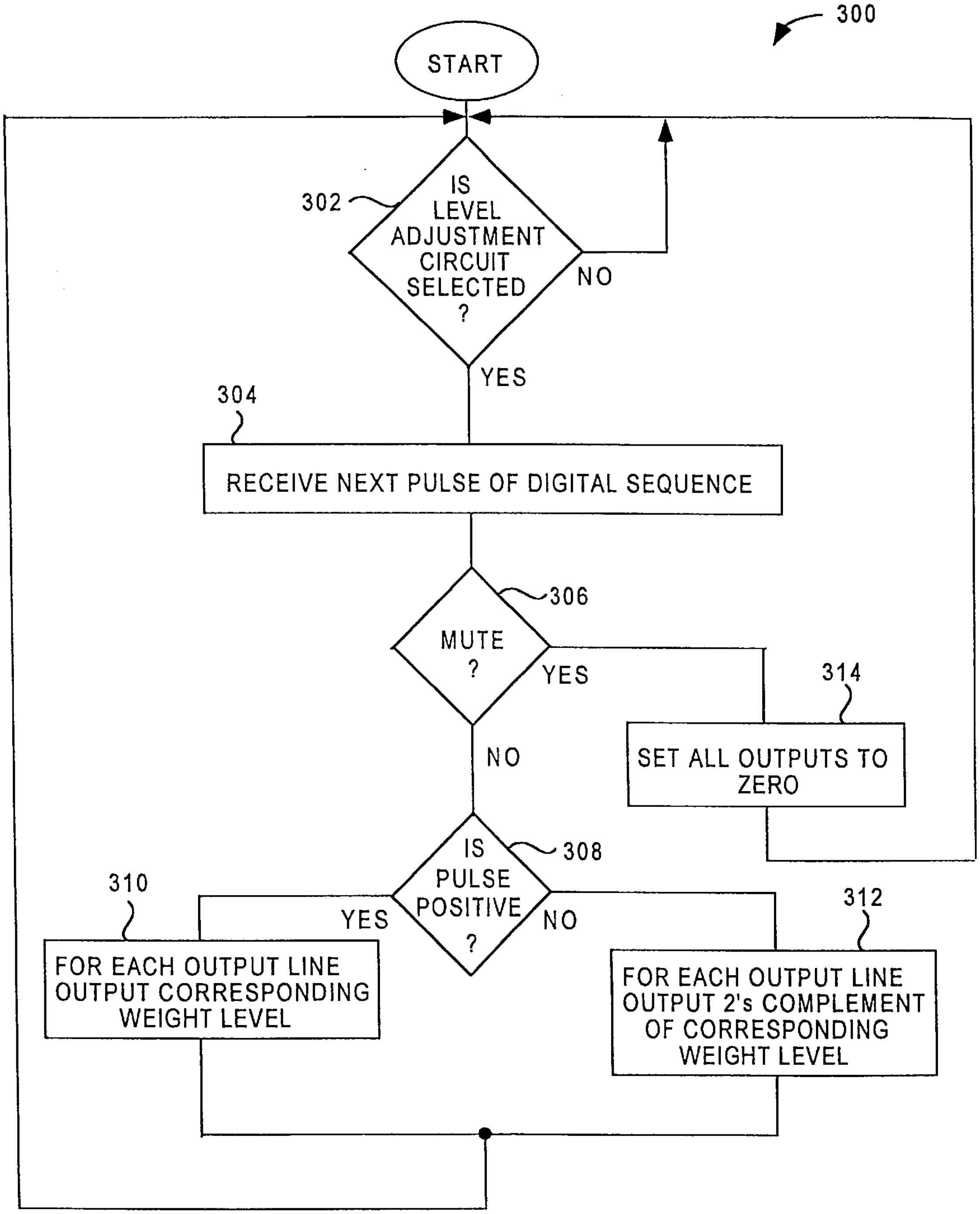
FIG. 4 is a flow chart of the operation of the level adjustment circuits of FIG. 3.

The details of the operation ol the level adjustment circuits 110–116 shown in FIG. 3 are described in FIG. 4. In particular, FIG. 4 is a flowchart of a method 300 performed by the level adjustment circuits 110–116. The method 300 begins with a decision step 302 based on whether a particular level adjustment circuit is being selected. In the embodiment shown in FIG. 3, each of the level adjustment circuits 110–116 can be selected concurrently. However, the embodiment shown in FIG. 5 and described below activates only one of the level adjustment circuits at a time. If a decision step 302 indicates that the particular level adjustment circuit is not currently selected, then the particular level adjustment circuit simply waits until it is selected. On the other hand, when the particular level adjustment circuit is selected, the decision step 302 is satisfied and the method 300 continues.

The selected level adjustment circuit then receives in a step 304 the next pulse of the digital sequence serving as its input. Next, a decision step 306 is made based on a mute control signal. If the mute control signal is active, then all outputs of the level adjustment circuit associated with the particular mute control signal are set to zero. In this case, the computer system instructs the corresponding level adjustment circuit to mute its contribution to the output lines. This is done by simply setting all the outputs to zero and, in a step 314, then returning to the beginning of the method 300 to wait until the level adjustment circuit is next selected.

On the other hand, if the mute control signal is not active, a decision step 308 is then made based on whether the pulse of the digital sequence is positive. If the pulse being evaluated is positive, the selected level adjustment circuit outputs in a step 310 the weight level corresponding to each of the output lines. On the other hand, if the pulse is not positive (i.e., negative), then the selected level adjustment circuit outputs in a step 312 the 2's complement of the corresponding weight level corresponding to each output line. For example, if the weight value associated with the level adjustment circuit 110 and the first output line is 0111000, and the pulse in the digital sequence being evaluated is positive, then the weighted digital sequence output to the adder 118 is 0111000. On the other hand, if the pulse in the digital sequence being evaluated is negative, the weighted digital sequence output to the adder 118 from the level adjustment circuit 110 is 1001000.

It is therefore clear from the preceding discussion that the process can develop −w from +w by forming a two's complement. As is well known to those skilled in the art, a two's complement of a binary number is formed by complementing the bits of the binary number and adding +1.

Figure 5:
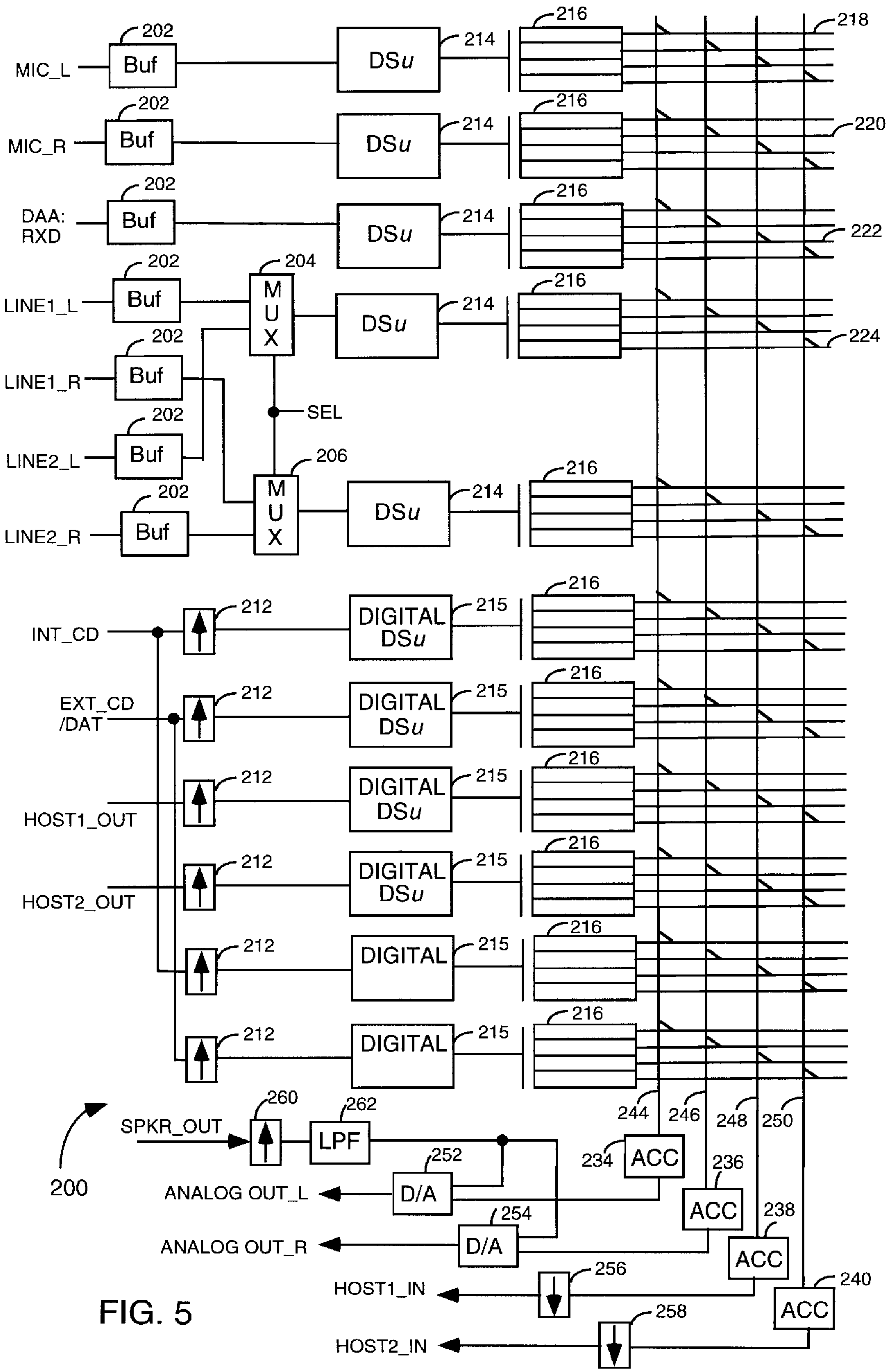
FIG. 5 is a block diagram of an apparatus according to a second embodiment of the invention.

FIG. 5 is a block diagram of an apparatus 200 according to a second embodiment of the invention. The input sources to this embodiment include left and right microphone inputs MIC_L and MIC_R, data access arrangement (DAA) receive data line RXD, left and right inputs for a first generic line LINE1_L and LINE1_R, left and right inputs for a second generic line LINE2_L and LINE2_R, internal compact disc input line INT_CD, external compact disc input line EXT_CD or digital audio tape recorder (DAT) input line, first host output line HOST1_OUT, and second host output line HOST2_OUT. The DAA receive data line RXD enables the apparatus to process telephony signals. The analog input sources are supplied to buffers 202 which operate as fixed gain amplifiers. Depending on the type of analog input source, the amplitude of the analog input signals are adjusted to a level which minimizes the quantization error associated with the analog-to-digital conversion. For example, the microphone inputs MIC_L and MIC_R could be amplified 30 dB by the buffers 202, and the first generic lines LINE1_L and LINE1_R and the second generic lines LINE2_L and LINE2_R could be amplified 0 dB by the buffers 202. Multiplexers 204 and 206 may be provided to allow for a switching between the first and second generic lines in accordance with a select signal (SEL).

The digital input sources are treated somewhat differently. The interpolators 212 and 213 operate to increase the sample rate so as to match the external device's sample rate with the internal sample rate of the apparatus 200 as is well known in the art. The sample rate converted internal CD input line INT_CD and the external CD input line EXT_CD are then supplied to digital delta sigma modulators 215 and then to register files 216. These register files can be register stacks, or can be other data structures as is well known to those skilled in the art.

Once the analog input sources arc amplified by the buffers 202, the buffered analog signals are then sent to delta sigma modulators 214. Each of the delta sigma modulators 214 receives one of the buffered analog signals and produces a digital output sequence corresponding thereto. Similarly, the interpolated digital input sources produced by the interpolators 212 and 213 are sent to digital delta sigma modulators 215. Each of the digital delta sigma modulators 215 receives one of the interpolated digital input sources and produces a digital output sequence corresponding thereto. Each of the digital output sequences is a serial digital signal that is one-bit wide. The serial digital signal in this embodiment is interpreted as having a value of +1 or −1. Delta sigma modulators 214 and 215 are a type of analog-to-digital converter in which the density of pulses in the resulting digital sequence represent the relative amplitude of the input signal. As mentioned above, due to the fact that delta sigma modulators are well known in the art, they are not further discussed herein.

The digital output sequences output from each of the delta sigma modulators 214 and 215 are then supplied to register files 216. Each of the register files 216 is a preferred implementation of a level adjustment circuit as used in the first embodiment shown in FIG. 3. Each of the register files 216 includes a plurality of registers and additional control circuitry. Namely, each of the register files 216 includes a register for each output line of the apparatus 200. In the second embodiment shown in FIG. 5, there are four output lines ANALOG OUT_L, ANALOG OUT_R, HOSTI_IN and HOST2_IN; hence, each of the register files 216 includes four (4) registers, one for each of the output lines. Each of the registers within a particular register file 216 correspond to one of the output lines. Each register also stores or holds a weight value. The weight value is a multi-bit digital value that designates the level to which the corresponding serial digital signal will affect the signals to be provided to the corresponding output line. The control circuitry (not shown) operates to enable software to set or change the weight values for each of the sound inputs. The control circuitry is not explicitly shown because such would be readily known to those in the art. For example, the registers could be addressable and the computer system could (under software control) dynamically change weight values to the registers.

The digital output sequences directed to each of the register files 216 operate to select either the weight values stored in the registers or the 2 s complement of the weight values stored in the registers. For example, if the weight value is 01010110 and the associated pulse of the digital output sequence is +1 at a particular sample time, then the selected weight value output from the register file 216 is 01010110. On the other hand, if the associated pulse of the digital output sequence is −1 at a particular sample time, then the selected weight value output from the register file is 10101010 (i.e., the 2 s complement of 01010110). The control circuitry (either separate or incorporated within the register file) performs the well known 2 s complement operation so as to represent a negative value in binary format. Since the selected weight values for each input sound source are changing with the sign of the pulses of the corresponding digital sequence, the outputs from the register files 216 are denoted weighted digital sequences.

In any case, the weighted digital sequences (i.e., selected weight values) are output from the register files 216 via register buses 218, 220, 222 and 224. The register buses 218–224 for each of the register files 216 are selectively coupled to summation buses 226, 228, 230 and 232. The summation buses 226–232 are respectively connected to accumulator circuits 234, 236, 238 and 240. The accumulator circuits 234–240 operate to accumulate the weighted digital sequences output for each of the output lines. Namely, the accumulator circuit 234 accumulates, within the delta sigma modulator clock period, the weighted digital sequences output from a first register of each of the register files 216 via register bus 218 and summation bus 226. At the same time, the accumulator circuit 236 accumulates the weighted digital sequences output from a second register of each of the register files 216 via register bus 220 and summation bus 228, the accumulator circuit 238 accumulates the weighted digital sequences output from a third register of each of the register files 216 via register bus 222 and summation bus 230, and the accumulator circuit 240 accumulates the weighted digital sequences output from a fourth register of each of the register files 216 via register bus 224 and summation bus 232. This accumulation of the weighted digital sequences is achieved in a time slice manner, whereby within the delta sigma modulator clock period each of the input sources is sequentially activated so that their weighted digital sequences (i.e., selected weight values) can be added by the accumulator circuits 234–240.

Once the delta sigma modulator clock period is completed, all of the weighted digital sequences for the sound input sources have been added by the accumulator circuits 234–240. These accumulated values are then forwarded to the output lines because the accumulated values are digital values which represent the mixed signal produced from the various input sound sources. The second embodiment has four output lines, two analog and two digital. The two analog output lines form an analog stereo channel and the two digital output lines form a digital stereo channel. More particularly, the accumulated value determined by the accumulator circuit 234 is supplied to a digital-to-analog converter 252 via a first output bus 244. The digital-to-analog converter 252 converts the accumulated value to an analog signal and then outputs the signal on a first analog Output line ANALOG OUT_L. The accumulated value determined by the accumulator circuit 236 is supplied to a second digital-to-analog circuit 254 via a second output bus 246. The second digital-to-analog circuit 254 converts the accumulated value to an analog signal and then outputs the second analog output line ANALOG OUT_R. Consistent with the analog-to-digital conversion process described heretofore, the digital-to-analog converter circuits 252 and 254 will typically use oversampled, noise-shaped conversion techniques, as are well known to those skilled in the art. The accumulated values determined by the accumulator circuits 238 and 240 are supplied to decimators 256 and 258, respectively, via third and fourth output buses 248 and 250. The decimator circuits 256 and 258 lower the sampling rate of the accumulated values, recovering a linear PCM representation of the mixed signal sounds, and then output respective digital signals on the first and second digital output lines HOST1_IN and HOST2_IN. Additionally, a speaker output signal SPKR_OUT from another apparatus can also be supplied to the apparatus 200. The speaker output signal SPKR_OUT is fed through all interpolator 260 and then a low pass filter 262 before being supplied to the digital-to-analog circuits 252 and 254. Hence, the digital-to-analog circuits 252 and 254 can optionally convert and output the speaker output signal SPKR_OUT to the first and second analog output lines ANALOG OUT_L and ANALOG OUT_R.

The delta sigma modulators 214 and 215 produce a single output pulse line which is used to select or not select weighting values and thereby generating pulse code modulation (PCM) signals. By arranging each delta sigma modulator so as to drive the weighting circuits (i.e., level adjustment circuit, stack register), as much or as little of each of the digitized signals may be forwarded to the various destinations. This allows complete flexibility in assigning a given input to one or more outputs as well as the relative strength a signal is to have on that output line. Moreover, since the weighting values are digital values, the weighting values may be changed dynamically to adjust either level or channel assignment with great flexibility and without causing analog artifacts (e.g., "clicks" or "pops").

The weighting values may include any number of bits, but practically, ranges between 4 and 16 bits in width. Preferably, a 8-bit width is used to provide a 48 dB adjustment range which is more than adequate for the needs of multimedia applications in personal computers. With 8-bit weighting values, the accumulator circuits 234, 236, 238 and 240 should store 11-bits. The simplest approach for determining the level of weighting desired is to have software set the weight values in a linear manner. However, an enhancement would be to provide a logarithmic response which is more in line with that of one's hearing characteristics. Either approach can be achieved with a look-up table.

Examples of uses of multimedia audio content in personal computers are known. One example is that the user may want to hear a CD-ROM in the background, while still being able to hear certain alert signals provided by the computer. If these independent audio sounds are not properly scaled in terms of their relative amplitudes, the playing of the CD-ROM may completely mask-out the alert sounds from the computer. Another example is that it may be useful to provide different volume controls for inputs and outputs, such as in the case where a CD-ROM is being played for language instruction as an output and at the same time a microphone is being used as an input. Here, the ability to provide separate volume adjustments would be very beneficial to the user s comfort and the performance of the program involved.

The invention reduces the amount of analog circuitry required. As a result, the area required to implement the multimedia functions is reduced. Hence, the invention supports low cost implementation of codec with numerous inputs. Another benefit of the invention is that by avoiding variable gain analog preamplifiers which are required by conventional techniques, the invention can be tested in a substantially shorter time period because fixed gain preamplifiers require much less time to test than do variable gain amplifiers. The invention also avoids digital multiplication which is an expensive operation.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for coding and decoding sound signals, said apparatus receiving a plurality of input sound signals on input signal lines and producing a plurality of digital output signals on output signal lines, said apparatus comprising:

a plurality of delta sigma modulators, each of said delta sigma modulators receiving a different one of the input sound signals and producing a serial digital sound signal having pulses determined by the corresponding input sound signal;

a plurality of level adjustment circuits, each of said level adjustment circuits corresponding to one of said delta sigma modulators and receiving the serial digital sound signal produced thereby, and each of said level adjustment circuits receiving a predetermined weight value for each of the output signal lines and respectively outputting a weighted digital signal for each of the output signal lines based on the corresponding weight value, the predetermined weight values being independently selectable; and a plurality of combiners, each of said combiners respectively combining the outputted weighted digital signals corresponding to one of the output signal lines.

2. An apparatus for coding and decoding sound signals, said apparatus receiving a plurality of input sound signals on input signal lines and producing a plurality of digital output signals on output signal lines, said apparatus comprising:

a plurality of delta sigma modulators, each of said delta sigma modulators receiving a different one of the input sound signals and producing a serial digital sound signal having pulses determined by the corresponding input sound signal;

a plurality of level adjustment circuits, each of said level adjustment circuits corresponding to one of said delta sigma modulators and receiving the serial digital sound signal produced thereby, and each of said level adjustment circuits receiving a predetermined weight value for each of the output signal lines and respectively outputting a weighted digital signal for each of the output signal lines based on the corresponding weight value and a plurality of combiners, each of said combiners respectively combining the outputted weighted digital signals corresponding to one of the output signal lines;

wherein each of the weighted digital signals output from each of said level adjustment circuits comprises one of the corresponding predetermined weight value and a negative representation of the corresponding predetermined weight value.

3. An apparatus as recited in claim 1, wherein each of said level adjustment circuits comprises means for selecting, for each of the weighted digital signals, one of the corresponding predetermined weight value and a negative representation of the corresponding predetermined weight value based on the sign of the serial digital sound signal.

4. An apparatus as recited in claim 3, wherein said combiners are adders, and each of said adders respectively adds the outputted weighted digital signals corresponding to each of the output signal lines.

5. An apparatus for coding and decoding sound signals, said apparatus receiving a plurality of input sound signals on input signal lines and producing a plurality of digital output signals on output signal lines, said apparatus comprising:

a plurality of delta sigma modulators, each of said delta sigma modulators receiving a different one of the input sound signals and producing a serial digital sound signal having pulses determined by the corresponding input sound signal;

a plurality of level adjustment circuits, each of said level adjustment circuits corresponding to one of said delta sigma modulators and receiving the serial digital sound signal produced thereby, and each of said level adjustment circuits receiving a predetermined weight value for each of the output signal lines and respectively outputting a weighted digital signal for each of the output signal lines based on the corresponding weight value; and a plurality of combiners, each of said combiners respectively combining the outputted weighted digital signals corresponding to one of the output signal lines, wherein each of said level adjustment circuits comprise a plurality of registers, each of said registers storing one of the predetermined weight values associated with said level adjustment circuit, and each of the predetermined weight values within each of said registers corresponding to a different one of the output signal lines.

6. An apparatus as recited in claim 5, wherein said combiners are adders, and each of said adders respectively adds the outputted weighted digital signals corresponding to each of the output signal lines.

7. An apparatus as recited in claim 1, wherein each of said level adjustment circuits comprise a register file, said register file being associated with one of said delta sigma modulators and storing a plurality of the predetermined weight values, each of the predetermined weight values within said register file corresponding to a different output signal line, and said register file producing a plurality of the weighted digital signals.

8. An apparatus as recited in claim 7, wherein said combiners are adders, and each of said adders respectively adds the outputted weighted digital signals corresponding to each of the output signal lines.

9. An apparatus as recited in claim 1, wherein said apparatus further comprises at least one digital-to-analog converter for converting at least one of the weighted digital signals to an analog output signal.

10. A method for coding sound signals for digital sound output signal lines, comprising:

(a) receiving analog sound signals, each of the input sound signals being received on a different input signal line;

(b) producing digital sound signals from each of the analog sound signals, each of the digital sound signals corresponding to one of the analog sound signals and including a serial stream of pulses determined based on the amplitude of the analog sound signal corresponding thereto;

(c) obtaining independently selectable digital weight values for each of the digital sound signals, the weight values for each of the digital sound signals including a weight value for each of the digital sound output signal lines;

(d) producing weighted digital sound signals for each of the digital sound output signal lines based on the digital sound signals and the weight values; and (e) for each of the digital sound output signal lines, summing the weighted digital sound signals directed to each of the digital sound output signal lines, thereby producing signals for the digital sound output signal lines.

11. A method for coding sound signals for digital sound output signal lines, comprising:

(a) receiving analog sound signals;

(b) producing digital sound signals from each of the analog sound signals, each of the digital sound signals corresponding to one of the analog sound signals and including a serial stream of pulses determined based on the amplitude of the analog sound signal corresponding thereto;

(c) obtaining weight values for each of the digital sound signals, the weight values for each of the digital sound signals including a weight value for each of the digital sound output signal lines;

(d) producing weighted digital sound signals for each of the digital sound output signal lines based on the digital sound signals and the weight values, for each of the digital sound signals said producing the corresponding weight value or its complement for each of the digital sound output signal lines; and (e) for each of the digital sound output signal lines, summing the weighted digital sound signals directed to each of the digital sound output signal lines, thereby producing signals for the digital sound output signal lines.

12. A method as recited in claim 11, wherein said producing (d) outputs the corresponding weight value if the corresponding digital sound signal is greater than zero, and outputs the complemented weight value if the corresponding digital sound signal is not greater than zero.

13. A method as recited in claim 10, wherein the weight values are being determined so as to provide a logarithmic response.

* * * * *